United States Patent
Krumpelt et al.

(10) Patent No.: US 6,967,063 B2
(45) Date of Patent: Nov. 22, 2005

(54) AUTOTHERMAL HYDRODESULFURIZING REFORMING METHOD AND CATALYST

(75) Inventors: Michael Krumpelt, Naperville, IL (US); John P. Kopasz, Bolingbrook, IL (US); Shabbir Ahmed, Naperville, IL (US); Richard Li-chih Kao, Northbrook, IL (US); Sarabjit Singh Randhava, Evanston, IL (US)

(73) Assignee: The University of Chicago, Chicago, IL (US)

( * ) Notice: Subject to any disclaimer, the term of this patent is extended or adjusted under 35 U.S.C. 154(b) by 296 days.

(21) Appl. No.: 09/860,851

(22) Filed: May 18, 2001

(65) Prior Publication Data
US 2003/0042173 A1 Mar. 6, 2003

(51) Int. Cl.$^7$ .............................. C01B 3/26; H01M 8/04
(52) U.S. Cl. ...................... 429/17; 423/648.1; 423/652; 423/653; 423/654
(58) Field of Search ................................. 423/650, 651, 423/652, 653, 654, 648.1; 429/17

(56) References Cited

U.S. PATENT DOCUMENTS

| | | |
|---|---|---|
| 1,931,492 A | 10/1933 | Hennicke |
| 2,824,620 A | 2/1958 | De Rosset |
| 2,889,273 A | 6/1959 | Northcott et al. |
| 3,144,312 A | 8/1964 | Mertens |
| 3,197,284 A | 7/1965 | Hoekstra |
| 3,208,198 A | 9/1965 | Rubin |
| 3,336,730 A | 8/1967 | McBride et al. |
| 3,338,681 A | 8/1967 | Kordesch |
| 3,350,176 A | 10/1967 | Green et al. |
| 3,368,329 A | 2/1968 | Eguchi et al. |
| 3,450,500 A | 6/1969 | Setzer et al. |
| 3,469,944 A | 9/1969 | Bocard et al. |
| 3,476,534 A | 11/1969 | Buswell et al. |
| 3,524,819 A | 8/1970 | Guerrieri |
| 3,645,701 A | 2/1972 | Banchik et al. |
| 3,665,680 A | 5/1972 | Heuser |
| 3,713,270 A | 1/1973 | Farr et al. |
| 3,732,155 A | 5/1973 | Cecil et al. |
| 3,839,193 A | 10/1974 | Hayes |
| 3,881,891 A | 5/1975 | Goltsov et al. |
| 3,955,941 A | 5/1976 | Houseman et al. |

(Continued)

FOREIGN PATENT DOCUMENTS

| | | |
|---|---|---|
| WO | 00/66487 | 11/2000 |
| WO | 00/78669 | 12/2000 |

OTHER PUBLICATIONS

J.P. Kopasz et al.: *Effects of Gasoline Components on Fuel Processing and Implications for Fuel Cell Fuels*, 2000 Fuel Cell Seminar Abstracts, 284–287, Oct./Nov. 2000.

Yu–Ming Lin et al.: *Process development for generating high purity hydrogen by using supported palladium membrane reactor as steam reformer*, International Journal of Hydrogen Energy, 25, 211–219, 2000, (no month).

W.J. Onstot et al.: *Design Aspects of Membrane Reactors for Dry Reforming of Methane for the Production of Hydrogen*, Ind. Eng. Chem. Res., vol. 40, No. 1, 242–251, 2001, (no month).

*Primary Examiner*—Wayne A. Langel
(74) *Attorney, Agent, or Firm*—Welsh, Katz, Ltd.; Thomas W. Tolpin

(57) ABSTRACT

A method for reforming a sulfur-containing carbonaceous fuel in which the sulfur-containing carbonaceous fuel is mixed with $H_2O$ and an oxidant, forming a fuel/$H_2O$/oxidant mixture. The fuel $H_2O$/oxidant mixture is brought into contact with a catalyst composition comprising a dehydrogenation portion, an oxidation portion and a hydrodesulfurization portion, resulting in formation of a hydrogen-containing gas stream.

26 Claims, 6 Drawing Sheets

BLOCK DIAGRAM OF FUEL PROCESSOR
FOR CELL POWER SYSTEM

U.S. PATENT DOCUMENTS

| | | |
|---|---|---|
| 3,965,252 A | 6/1976 | Kmecak et al. |
| 3,969,222 A | 7/1976 | Hayes |
| 3,972,695 A | 8/1976 | Buckley et al. |
| 3,978,004 A | 8/1976 | Daumas et al. |
| 3,980,452 A | 9/1976 | Krumm et al. |
| 4,003,725 A | 1/1977 | Bunn, Jr. et al. |
| 4,056,373 A | 11/1977 | Rubin |
| 4,127,393 A | 11/1978 | Timmins et al. |
| 4,177,163 A | 12/1979 | Oleck et al. |
| 4,234,458 A | 11/1980 | Antos |
| 4,254,086 A | 3/1981 | Sanders |
| 4,272,357 A | 6/1981 | Rollmann |
| 4,400,182 A | 8/1983 | Davies et al. |
| 4,415,484 A | 11/1983 | Setzer et al. |
| 4,451,578 A | 5/1984 | Setzer et al. |
| 4,468,235 A | 8/1984 | Hill |
| 4,472,176 A | 9/1984 | Rubin |
| 4,473,543 A | 9/1984 | Setzer et al. |
| 4,503,029 A * | 3/1985 | Setzer .................. 423/652 |
| 4,522,894 A | 6/1985 | Hwang et al. |
| 4,539,310 A | 9/1985 | Leftin et al. |
| 4,553,981 A | 11/1985 | Fuderer |
| 4,589,891 A | 5/1986 | Iniotakis et al. |
| 4,632,774 A | 12/1986 | Fox et al. |
| 4,654,063 A | 3/1987 | Auvil et al. |
| 4,690,690 A | 9/1987 | Andrew et al. |
| 4,693,882 A | 9/1987 | Setzer et al. |
| 4,695,366 A | 9/1987 | Miller et al. |
| 4,699,637 A | 10/1987 | Iniotakis et al. |
| 4,713,234 A | 12/1987 | Weirich et al. |
| 4,743,353 A | 5/1988 | Ting et al. |
| 4,750,986 A | 6/1988 | Pinto |
| 4,755,498 A | 7/1988 | Setzer et al. |
| 4,780,300 A | 10/1988 | Yokoyama et al. |
| 4,781,241 A | 11/1988 | Misage et al. |
| 4,788,004 A | 11/1988 | Pinto et al. |
| 4,797,195 A | 1/1989 | Kukes et al. |
| 4,810,485 A | 3/1989 | Marianowski et al. |
| 4,830,834 A | 5/1989 | Stahl et al. |
| 4,838,897 A | 6/1989 | Amano et al. |
| 4,849,187 A | 7/1989 | Uozu et al. |
| 4,865,624 A | 9/1989 | Okada |
| 4,897,181 A | 1/1990 | Houghton |
| 4,904,455 A | 2/1990 | Karafian et al. |
| 4,906,176 A | 3/1990 | Yamashita et al. |
| 4,909,808 A | 3/1990 | Voecks |
| 4,938,685 A | 7/1990 | Noakes et al. |
| 4,940,532 A | 7/1990 | Peer et al. |
| 4,946,667 A | 8/1990 | Beshty |
| 4,981,676 A | 1/1991 | Minet et al. |
| 5,004,592 A | 4/1991 | Pinto |
| 5,026,536 A * | 6/1991 | Shiori et al. ............. 423/652 |
| 5,039,510 A | 8/1991 | Pinto |
| 5,041,208 A | 8/1991 | Patridge et al. |
| 5,110,563 A | 5/1992 | Noakes et al. |
| 5,112,578 A | 5/1992 | Murayama et al. |
| 5,130,114 A * | 7/1992 | Igarashi .................. 423/652 |
| 5,130,115 A * | 7/1992 | Fujisou et al. ............ 423/652 |
| 5,156,821 A | 10/1992 | Murayama |
| 5,205,841 A | 4/1993 | Vaiman |
| 5,211,837 A | 5/1993 | Russ et al. |
| 5,215,729 A | 6/1993 | Buxbaum |
| 5,226,928 A | 7/1993 | Makabe et al. |
| 5,264,202 A | 11/1993 | Snyder |
| 5,270,272 A * | 12/1993 | Galperin et al. ............ 208/140 |
| 5,326,550 A | 7/1994 | Adris et al. |
| 5,336,394 A | 8/1994 | Iino et al. .................. 208/216 |
| 5,354,547 A | 10/1994 | Rao et al. |
| 5,356,851 A | 10/1994 | Sarrazin et al. |
| 5,376,167 A | 12/1994 | Broutin et al. |
| 5,382,271 A | 1/1995 | Ng et al. |
| 5,389,595 A | 2/1995 | Simpson et al. |
| 5,393,325 A | 2/1995 | Edlund |
| 5,411,927 A | 5/1995 | Choudhary et al. |
| 5,449,848 A | 9/1995 | Itoh |
| 5,458,857 A | 10/1995 | Collins et al. |
| 5,484,577 A | 1/1996 | Buswell et al. |
| 5,498,278 A | 3/1996 | Edlund |
| 5,510,201 A | 4/1996 | Werth |
| 5,516,344 A | 5/1996 | Corrigan |
| 5,518,530 A | 5/1996 | Sakai et al. |
| 5,525,322 A | 6/1996 | Willms |
| 5,612,012 A | 3/1997 | Soma et al. |
| 5,637,259 A | 6/1997 | Galuszka et al. |
| 5,639,431 A | 6/1997 | Shirasaki et al. |
| 5,645,626 A | 7/1997 | Edlund et al. |
| 5,756,421 A | 5/1998 | Choudhary et al. |
| 5,772,707 A | 6/1998 | Wiesheu et al. |
| 5,782,960 A | 7/1998 | Ogawa et al. |
| 5,821,185 A | 10/1998 | White et al. |
| 5,846,406 A | 12/1998 | Sudhakar et al. |
| 5,861,137 A | 1/1999 | Edlund |
| 5,888,273 A | 3/1999 | Buxbaum |
| 5,897,970 A | 4/1999 | Isomura et al. |
| 5,929,286 A * | 7/1999 | Krumpelt et al. ........... 423/656 |
| 5,931,987 A | 8/1999 | Buxbaum |
| 5,938,800 A | 8/1999 | Verrill et al. |
| 5,989,503 A | 11/1999 | Wiesheu et al. |
| 5,997,594 A | 12/1999 | Edlund et al. |
| 5,997,835 A | 12/1999 | Hyldtoft et al. |
| 6,013,173 A | 1/2000 | Bogdan |
| 6,056,936 A | 5/2000 | Nougayrede et al. |
| 6,063,723 A | 5/2000 | Miller |
| 6,083,379 A | 7/2000 | Drake et al. |
| 6,083,425 A | 7/2000 | Clawson et al. |
| 6,103,143 A | 8/2000 | Sircar et al. |
| 6,110,861 A | 8/2000 | Krumpelt et al. ........... 502/326 |
| 6,123,913 A | 9/2000 | Clawson et al. |
| 6,126,908 A | 10/2000 | Clawson et al. |
| 6,152,995 A | 11/2000 | Edlund |
| 6,168,650 B1 | 1/2001 | Buxbaum |
| 6,171,574 B1 | 1/2001 | Juda et al. |
| 6,180,081 B1 | 1/2001 | Poschmann et al. |
| 6,183,543 B1 | 2/2001 | Buxbuam |
| 6,207,122 B1 | 3/2001 | Clawson et al. |
| 6,221,117 B1 | 4/2001 | Edlund et al. |
| 6,221,280 B1 | 4/2001 | Anumakonda et al. |
| 6,238,816 B1 * | 5/2001 | Cable et al. ............... 423/653 |
| 6,416,731 B1 * | 7/2002 | Dohrup et al. ............. 423/653 |
| 6,436,363 B1 * | 8/2002 | Hwang et al. ............. 423/651 |
| 6,506,359 B1 * | 1/2003 | Maruko .................... 423/652 |
| 6,524,550 B1 * | 2/2003 | Chintawar et al. .......... 423/652 |
| 6,576,217 B1 * | 6/2003 | Nojima et al. ............. 423/651 |
| 2002/0114747 A1 * | 8/2002 | Marchand et al. |
| 2002/0172630 A1 * | 11/2002 | Ahmed et al. |

\* cited by examiner

US 6,967,063 B2

AUTOTHERMAL HYDRODESULFURIZING REFORMING METHOD AND CATALYST

STATEMENT REGARDING FEDERALLY SPONSORED RESEARCH OR DEVELOPMENT

The United States Government has rights in this invention pursuant to Contract No. W-31-109-ENG-38 between the U.S. Department of Energy (DOE) and The University of Chicago representing Argonne National Laboratory.

BACKGROUND OF THE INVENTION

1. Field of the Invention

This invention relates to a method for reforming a sulfur-containing carbonaceous fuel to produce a hydrogen-rich gas suitable for use in fuel cell power generating systems or other systems which generally are not sulfur-tolerant and a catalyst composition for use in the method. The catalyst is a multi-part reforming catalyst comprising a dehydrogenation portion, an oxidation portion and a hydrodesulfurization portion.

2. Description of Prior Art

A fuel cell is an electrochemical device comprising an anode electrode, a cathode electrode and an electrolyte disposed between the anode electrode and the cathode electrode. Individual fuel cells or fuel cell units typically are stacked with bipolar separator plates separating the anode electrode of one fuel cell unit from the cathode electrode of an adjacent fuel cell unit to produce fuel cell stacks. There are four basic types of fuel cells, molten carbonate, phosphoric acid, solid oxide and polymer electrolyte membrane. Fuel cells typically consume a gaseous fuel and generate electricity.

Substantial advancements have been made during the past several years in fuel cells for transportation, stationary and portable power generation applications.

These advancements have been spurred by the recognition that these electrochemical devices have the potential for high efficiency and lower emissions than conventional power producing equipment. Increased interest in the commercialization of polymer electrolyte membrane fuel cells, in particular, has resulted from recent advances in fuel cell technology, such as the 100-fold reduction in the platinum content of the electrodes and more economical bipolar separator plates.

Ideally, polymer electrolyte membrane fuel cells operate with hydrogen. In the absence of a viable hydrogen storage option or a near-term hydrogen-refueling infrastructure, it is necessary to convert available fuels, typically $C_xH_y$ and $C_xH_yO_z$, collectively referred to herein as carbonaceous fuels, with a fuel processor into a hydrogen-rich gas suitable for use in fuel cells. The choice of fuel for fuel cell systems will be determined by the nature of the application and the fuel available at the point of use. In transportation applications, it may be gasoline, diesel, methanol or ethanol. In stationary systems, it is likely to be natural gas or liquified petroleum gas. In certain niche markets, the fuel could be ethanol, butane or even biomass-derived materials. In all cases, reforming of the fuel is necessary to produce a hydrogen-rich fuel.

There are basically three types of fuel processors—steam reformers, partial oxidation reformers and autothermal reformers. Most currently available fuel processors employing the steam reforming reaction are large, heavy and expensive. For fuel cell applications such as in homes, mobile homes and light-duty vehicles, the fuel processor must be compact, lightweight and inexpensive to build/manufacture and it should operate efficiently, be capable of rapid start and load following, and enable extended maintenance-free operation.

Partial oxidation and autothermal reforming best meet these requirements. However, it is preferred that the reforming process be carried out catalytically to reduce the operating temperature, which translates into lower cost and higher efficiency, and to reduce reactor volume. U.S. Pat. No. 6,110,861 to Krumpelt et al. teaches a two-part catalyst comprising a dehydrogenation portion and an oxide-ion conducting portion for partially oxidizing carbonaceous fuels such as gasoline to produce a high percentage yield of hydrogen suitable for supplying a fuel cell. The dehydrogenation portion of the catalyst is a Group VIII metal and the oxide-ion conducting portion is selected from a ceramic oxide crystallizing in the fluorite or perovskite structure. However, reforming catalysts, which are often Ni-based, are poisoned by sulfur impurities in the carbonaceous fuels, thereby requiring the addition of a hydrodesulfurization step or a sulfur adsorption bed to the fuel processor upstream of the reforming step. This is due to the adsorption of sulfur on the active metal catalyst sites. Sulfur also tends to increase coking rates, which leads to further degradation of the reforming catalysts and unacceptable catalyst performance.

Other methods for addressing this problem are known, such as U.S. Pat. No. 5,336,394 to Iino et al. which teaches a process for hydrodesulfurizing a sulfur-containing hydrocarbon in which the sulfur-containing hydrocarbon is contacted in the presence of hydrogen with a catalyst composition comprising a Group VIA metal, a Group VIII metal and an alumina under hydrodesulfurizing conditions and U.S. Pat. No. 5,270,272 to Galperin et al. which teaches a sulfur-sensitive conversion catalyst suitable for use in a reforming process in which the feedstock contains small amounts of sulfur and a method for regeneration of the catalyst. The catalyst comprises a non-acidic large-pore molecular sieve, for example, L-zeolite, an alkali-metal component and a platinum-group metal component. In addition, it may include refractory inorganic oxides such as alumina, silica, titania, magnesia, zirconia, chromia, thoria, boria or mixtures thereof, synthetically or naturally occurring clays and silicates, crystalline zeolitic aluminosilicates, spinels such as $MgAl_2O_4$, $FeAl_2O_4$, $ZnAl_2O_4$, $CaAl_2O_4$, and combinations thereof. The catalyst may also contain other metal components known to modify the effect of the preferred platinum component, such as Group IVA (14) metals, non-noble Group VIII (8–10) metals, rhenium, indium, gallium, zinc, uranium, dysprosium, thallium and mixtures thereof. However, such known methods frequently require an additional step such as regeneration of the catalyst.

SUMMARY OF THE INVENTION

It is one object of this invention to provide a method for producing hydrogen-rich gas from sulfur-containing carbonaceous fuels which eliminates the requirement for sulfur removal prior to conversion of the carbonaceous fuels to hydrogen-rich gas.

It is another object of this invention to provide a method for converting sulfur-containing carbonaceous fuels to hydrogen-rich gas at temperatures less than the temperature employed in alternative, non-catalytic processes, thereby allowing the use of more common, lower cost reactor materials, such as steel instead of special expensive alloys or ceramic materials that are heavy, costly to fabricate and tend to be brittle.

It is yet a further object of this invention to provide a method for reforming of sulfur-containing carbonaceous fuels to hydrogen-rich gas which reduces the concentration of carbon monoxide in the raw reformate gas compared to conventional methods, thereby permitting substantially smaller downstream processing equipment, i.e. water-gas shift reactor.

These and other objects of this invention are addressed by a method for reforming a sulfur-containing carbonaceous fuel comprising the steps of mixing the sulfur-containing carbonaceous fuel with $H_2O$ and an oxidant selected from the group consisting of air, oxygen and mixtures thereof, forming a fuel/$H_2O$/oxidant mixture, and contacting the fuel/$H_2O$/oxidant mixture with a catalyst composition comprising a dehydrogenation portion, an oxidation portion and a hydrodesulfurization portion. The catalyst, which is suitable for reforming the sulfur-containing carbonaceous fuel at a temperature of less than about 1000° C., converts the carbonaceous fuels to a hydrogen-rich gas suitable for use in, among other applications, fuel cell power generating systems. Performance of the catalyst is not degraded and the catalyst is not poisoned by sulfur impurities in the fuels. The sulfur impurities, even complex benzothiophenes, are converted to hydrogen sulfide, hydrogen and carbon dioxide. If necessary, the hydrogen sulfide can then be adsorbed on a zinc-oxide bed. In accordance with one embodiment of this invention, the fuel/$H_2O$/oxidant mixture is preheated to a temperature up to about 1000° C.

The method of this invention enables the conversion of a wide variety of sulfur-laden carbonaceous fuels to hydrogen-rich gas at temperatures less than about 800° C., which is several hundred degrees lower than known alternative, noncatalytic processes.

In accordance with one preferred embodiment of this invention, the dehydration portion of the catalyst composition comprises a metal or metal alloy selected from the group consisting of Group VIII transition metals and mixtures thereof. Preferably, the oxidation portion of the catalyst composition comprises a ceramic oxide powder and a dopant selected from the group consisting of rare earth metals, alkaline earth metals, alkali metals and mixtures thereof. Preferably, the hydrodesulfurization portion of the catalyst composition comprises a material selected from the group consisting of Group IV rare earth metal sulfides, Group IV rare earth metal sulfates, their substoichiometric metals and mixtures thereof.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Sulfur impurities in carbonaceous fuels such as gasoline, diesel fuel, or natural gas, cause major problems for reforming these fuels to hydrogen-rich gas for use in fuel cell power generating systems or other purposes. The sulfur impurities poison the reforming catalysts, as well as other catalysts in the processing stream and catalysts in the fuel cells. Poisoning is generally due to adsorption of sulfur to the active metal catalyst sites. In addition, sulfur impurities increase the coking seen in the reforming catalysts, accelerating a second mechanism for degradation of the catalysts. To obtain a hydrogen-rich gas, the sulfur-containing carbonaceous fuels must first be desulfurized. This is generally achieved using hydrodesulfurization, which consumes some of the hydrogen produced. Adsorption processes are alternatives, but are generally less effective than hydrodesulfurization due to the complex nature of the sulfur impurities in diesel and gasoline fuels. The sulfur is in the form of thiols, thiophenes, and benzothiophenes. The organic functions make it difficult to absorb the sulfur-containing species preferentially.

In accordance with the method of the present invention, the sulfur-laden carbonaceous fuels are reformed over a sulfur tolerant and coking resistant catalyst prior to sulfur removal. The sulfur impurities are cracked or reformed to $H_2S$, $CO_2$ and $H_2$ in the autothermal hydrodesulfurizing reformer. The $H_2S$ can then be preferentially adsorbed on a zinc-oxide bed downstream of the reformer, if necessary.

This increases the overall efficiency of the fuel processor by eliminating the hydrodesulfurization or the sulfur adsorption step prior to the reformer. The bulk of the CO in the reformate exiting the zinc-oxide bed can then be converted to additional hydrogen by means of the water-gas shift reaction:

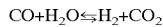

Shift reactors can lower the CO level to below 1%. The final CO contaminant reduction to less then 10 ppm levels required by a fuel cell stack is optimally approached using a catalytic preferential oxidation (PROX) step:

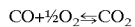

However, the reduction of CO levels to less than 10 ppm requires the use of control algorithms, particularly with respect to temperature control, including cascade control of the air being bled into the reactor, which dilutes the hydrogen concentration in the hydrogen-rich gas produced. Alternative CO removal systems, including $H_2$ separation using a palladium membrane and high temperature (200–300° C.) $CO_2$ separation membrane water-gas shift reactors, are considered to be promising new technologies that are currently being developed for achieving final CO clean-up.

Figure 1:
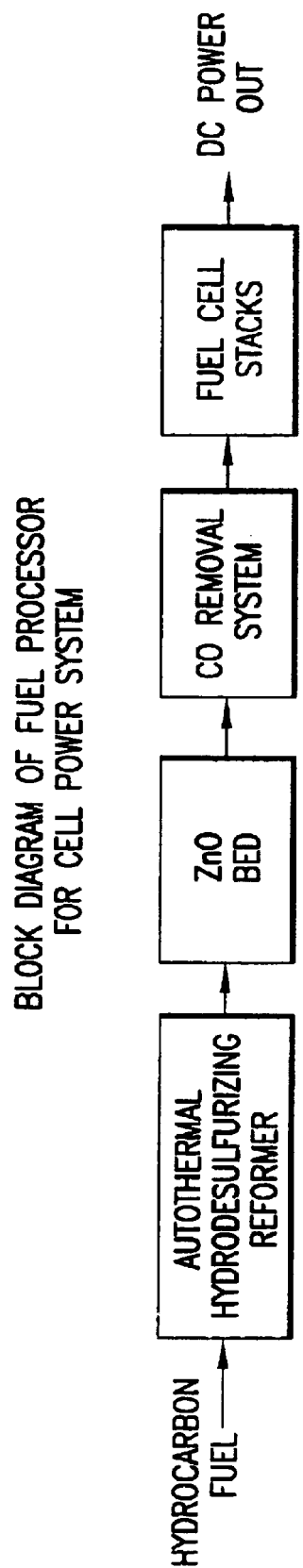
FIG. 1 is a block diagram of a fuel processor for a fuel cell power system.

Moreover, both of these new technologies increase the hydrogen concentration in the hydrogen-rich gas produced, which is then fed to the fuel cell stacks for DC power generation (FIG. 1).

The catalyst of this invention, which is suitable for use in reforming sulfur-laden carbonaceous fuels, is a multi-part catalyst comprising a dehydrogenation portion, an oxidation portion and a hydrodesulfurization portion. The dehydrogenation portion of the catalyst is selected from Group VIII transition metals and mixtures thereof. The oxidation portion of the catalyst in accordance with one preferred embodiment of this invention is a ceramic oxide powder including one or more of $ZrO_2$, $CeO_2$, $Bi_2O_3$, $BiVO_4$, $LaGdO_3$ and a dopant selected from the group consisting of rare earths, the alkaline earth and alkali metals. The hydrodesulfurization portion of the catalyst in accordance with one preferred embodiment of this invention comprises sulfides or sulfates of the rare earths (e.g., $Ce(SO_4)_2$), Group IV (e.g., $TiS_2$, $ZrS_2$, $Zr(SO_4)_2$) and their substoichiometric metals (e.g., $MS_x$, where x<2, such as $Ti(SO_4)_{1.5}$, $GdS_{1.5}$, $LaS_{1.5}$) which are more stable than the Group VIII metal sulfides. This is due to the higher strength of the metal-sulfur bonds compared to those for the Group VIII metals. The metal-sulfur bonds in these materials have bond strengths greater than 100 kcal/mol (e.g. 100, 136, 138 kcal/mol for Ti, Ce, and Zr—S bonds compared to 77, 79, 82 kcal/mol for Fe, Co, and Ni—S bonds).

The following examples are presented for the purpose of demonstrating the advantages of the catalyst composition of this invention over known catalyst compositions and are in no way intended to limit or otherwise reduce the scope of the invention claimed herein. In these examples, two autothermal hydrodesulfurizing reforming catalysts were used as follows: Catalyst 1—0.5 wt % Pt on $Ce_{0.8}Gd_{0.2}O_{1.9}$; presulfated Catalyst 1—0.5 wt % Pt on $Ce_{0.8}Gd_{0.2}O_{1.6}S_{0.3}$; Catalyst 2—0.5 wt % Pt on $Ce_{0.75}Sm_{0.234}Cs_{0.015}Li_{0.001}O_{1.86}$; and presulfated Catalyst 2-0.5 wt % Pt on $Ce_{0.75}Sm_{0.234}CS_{0.015}Li_{0.001}O_{1.54}S_{0.32}$. The sulfur tolerance and coking resistance of Catalyst 1 are illustrated with a 50 wppm sulfur level blended gasoline in Example 1; with diesel fuel with sulfur levels of 244 and 488 wppm over Catalyst 2 in Example 2; and improved hydrogen yield from autothermal hydrosulfurizing and reforming a sulfur-laden carbonaceous fuel compared with the same unsulfated carbonaceous fuel over catalysts of this invention are illustrated in Example 3.

EXAMPLE 1

Figure 2:
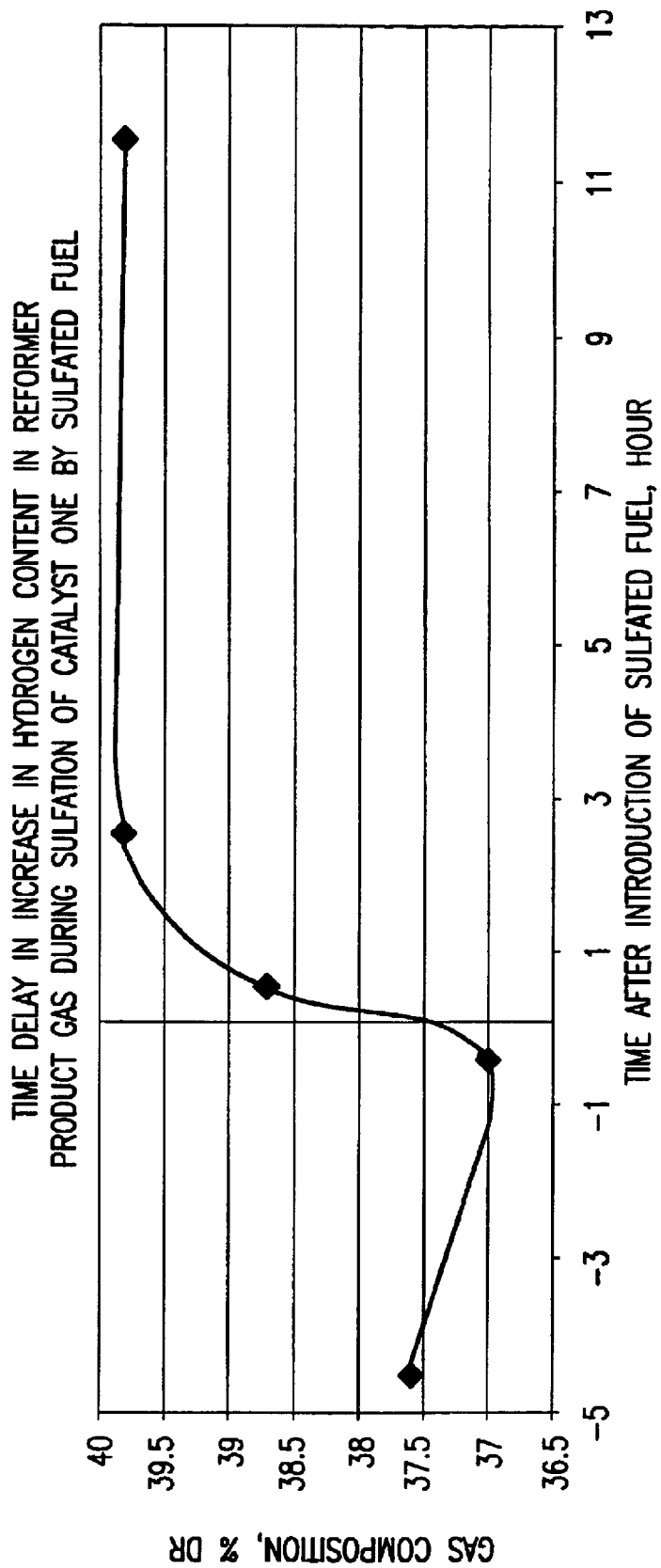
FIG. 2 is a diagram showing a time delay increase in hydrogen content of reformer product gas during sulfation of a catalyst suitable for use in the method of this invention by a sulfated fuel.
Figure 3:
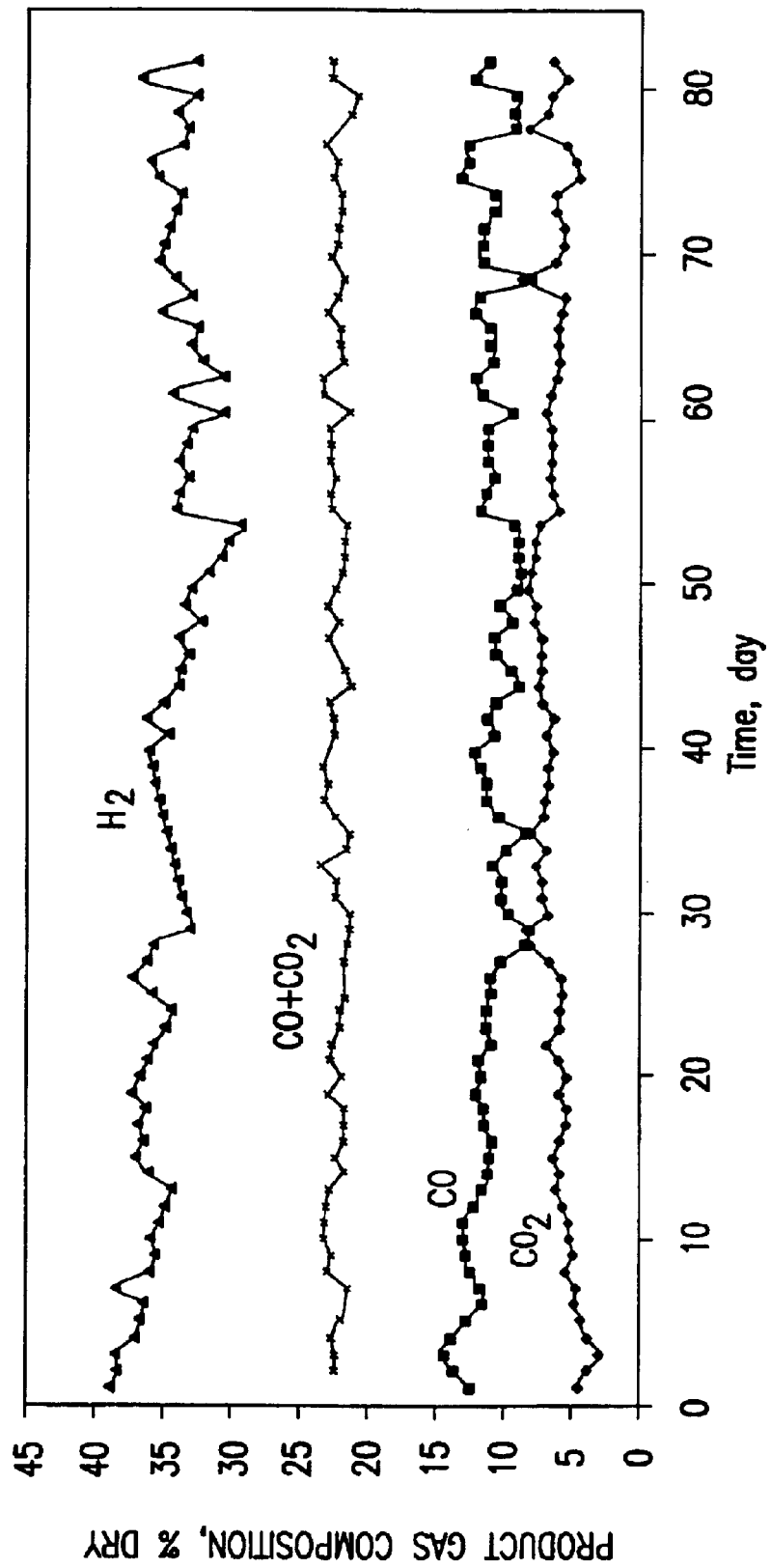
FIG. 3 is a diagram showing the long-term performance of one embodiment of the catalyst composition of this invention with a sulfur-laden blended gasoline.

This example illustrates the sulfur tolerance and coking resistance of a catalyst composition in accordance with one embodiment of this invention with a 50 wppm sulfur level blended gasoline. 20 g of Catalyst 1 were placed in a 16" long 0.34" internal diameter tubular reactor. The catalyst occupied 8" of the length and was located roughly in the center of the tubular reactor. The temperatures in the catalyst bed were maintained in the range of about 760 to 800° C., and the pressure was maintained at about 5 psig. The flow rates were: 0.2 ml/min carbonaceous fuel, 0.3 ml/min $H_2O$ and 515 sccm air. The carbonaceous fuel was a blended gasoline containing 74% by weight isooctane, 20% by weight xylene, 5% by weight methyl cyclohexane and 1% by weight pentene. At −4.5 hours, the operation starts with a pure blended gasoline feed, and at time zero, benzothiophene is introduced into the blended gasoline feed in an amount sufficient to provide a 50 wppm sulfur level. FIG. 2 shows the time delay in the increase in hydrogen content of the reformer product gas during sulfation of Catalyst 1 by the sulfated fuel. After 1700 hours of operation, the hydrogen production decreased less than 10%, thereby demonstrating that Catalyst 1 is both sulfur tolerant and coking resistant. The long term performance of Catalyst 1 is shown in FIG. 3.

EXAMPLE 2

Figure 4:
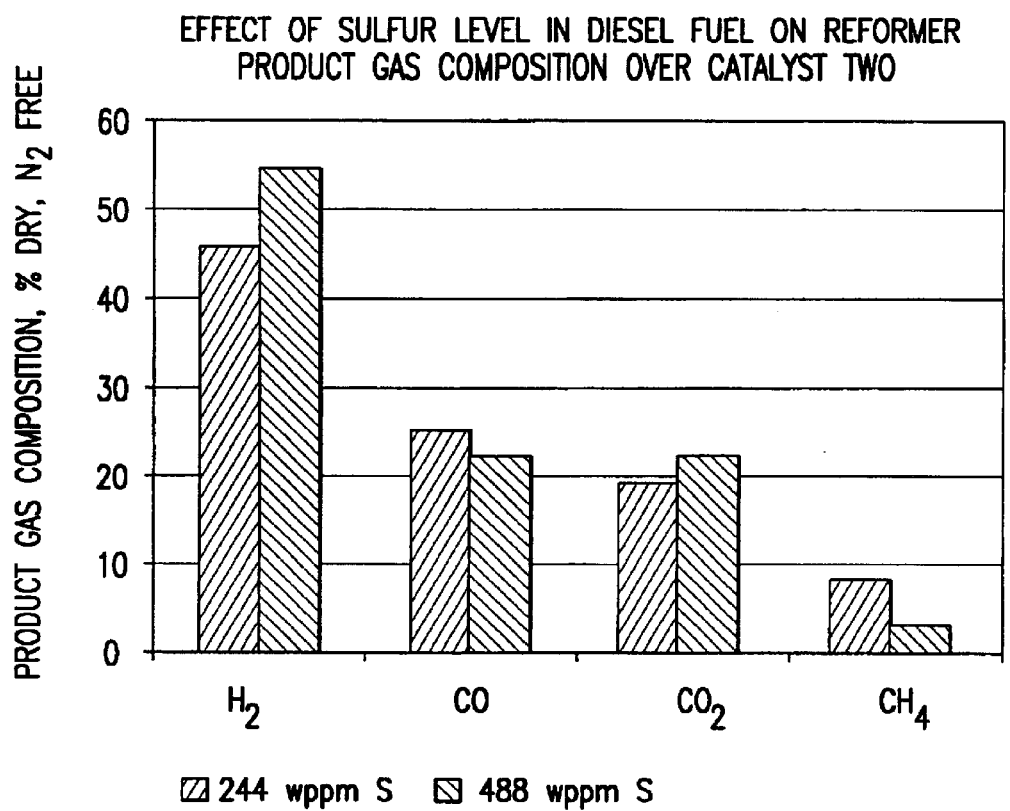
FIG. 4 is a diagram showing reformer product gas composition resulting from the autothermal hydrodesulfurizing and reforming of diesel fuel having high sulfur levels using one embodiment of the catalyst composition of this invention.

In this example, the sulfur tolerance and resistance of Catalyst 2 were demonstrated using $H_2O$, oxygen and diesel fuels having sulfur levels of 244 and 488 wppm at 800° C. The reformer product gas composition is shown in FIG. 4. In addition to demonstrating the sulfur tolerance and coking resistance of the catalyst, it was found that an increased sulfur concentration in the fuel resulted in an increase in hydrogen yield (from 45.5 to 54.0% dry, $N_2$-free).

EXAMPLE 3

Figure 5:
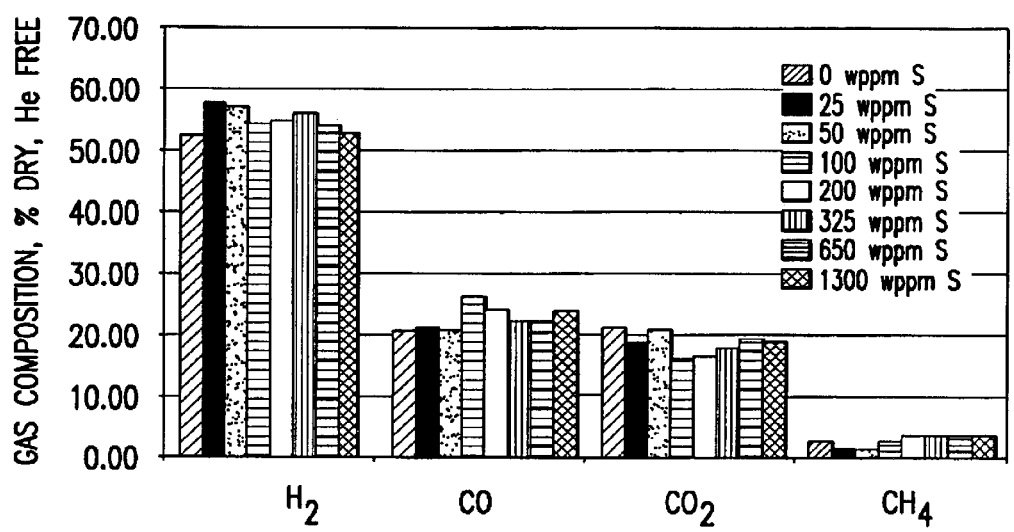
FIG. 5 is a diagram showing the effect of sulfur content of fuel on reformer product gas composition using a presulfated catalyst composition.
Figure 6:
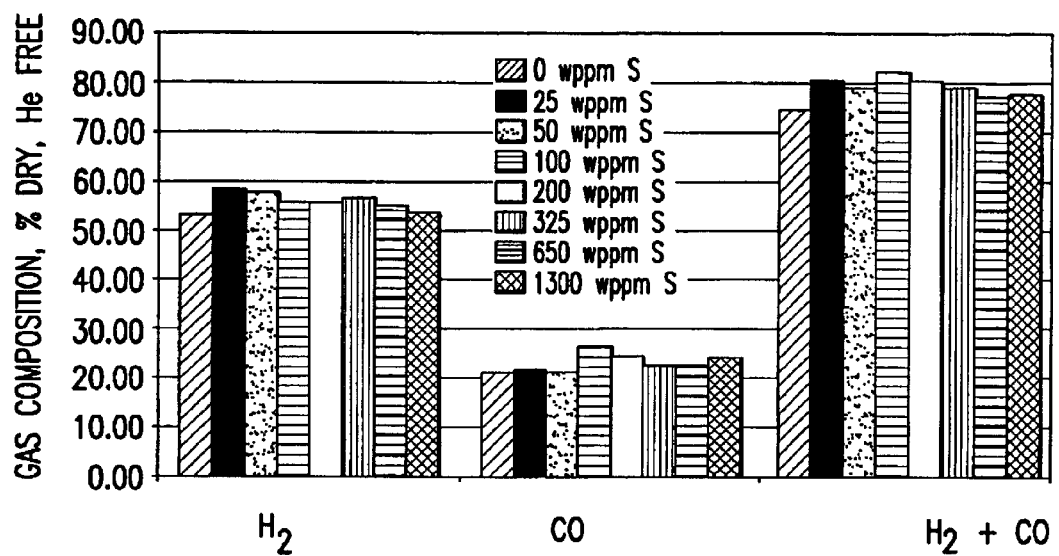
FIG. 6 is a diagram showing the effect of sulfur content on the sums of $H_2$ and CO in reformer product gas composition using a presulfated catalyst composition.

The test of Example 2 was repeated with isooctane doped with benzothiophene to provide sulfated fuels having sulfur levels in the range of about 25 to 1300 wppm over presulfated Catalyst 2 (FIG. 5). The results clearly show improved hydrogen yield at all fuel sulfur levels compared to the same catalyst and fuel stream where no sulfur is present. As shown in Table 1 hereinbelow, the hydrogen yield at 25 wppm S is 5.44% higher; at 100 wppm S, it is 2.34% higher; and at 325 wppm S, it is 3.17% higher than when no sulfur is present. Moreover, because the bulk of the CO in the reformate is converted to additional hydrogen by way of the water-gas shift reaction, the sums of hydrogen and CO for all sulfur levels are plotted in FIG. 6. The results show that the yield of hydrogen and CO at 25 wppm S is 6.14% higher; at 100 wppm S it is 7.75% higher; and at 325 wppm it is 4.81% higher than when no sulfur is present.

TABLE 1

Hydrogen-rich Gas (% dry, He-free) Obtained from Autothermal Hydrosulfurizing and Reforming of Carbonaceous Fuels with Sulfur Levels from 25 to 1300 wppm over Presulfated Catalyst 2

| Sulfur level, wppm | 0 | 25 | 50 | 100 | 200 | 325 | 650 | 1300 |
|---|---|---|---|---|---|---|---|---|
| $H_2$ | 53.10 | 58.54 | 57.60 | 55.44 | 55.59 | 56.27 | 54.62 | 53.15 |
| CO | 20.61 | 21.31 | 20.61 | 26.02 | 24.22 | 22.25 | 22.21 | 23.86 |
| $CO_2$ | 21.20 | 18.79 | 20.67 | 15.81 | 16.42 | 17.88 | 19.29 | 18.86 |
| $CH_4$ | 2.32 | 1.27 | 1.04 | 2.43 | 3.43 | 3.31 | 3.35 | 3.50 |
| $C_4H_9$ | 0.06 | 0.04 | 0.05 | 0.05 | 0.06 | 0.06 | 0.34 | 0.21 |
| $C_nH_m$, n > 4 | 2.71 | 0.05 | 0.03 | 0.25 | 0.28 | 0.23 | 0.19 | 0.42 |
| Total | 100.00 | 100.00 | 100.00 | 100.00 | 100.00 | 100.00 | 100.00 | 100.00 |
| $H_2$ + CO | 73.71 | 79.85 | 78.21 | 81.46 | 79.81 | 78.52 | 76.83 | 77.01 |

EXAMPLE 4

The hydrogen-rich gases produced in Example 3 yield the highest sum of hydrogen and CO when the sulfur level is 100 wppm in isooctane. The $H_2S$ in the hydrogen-rich gas can be preferentially absorbed on the zinc-oxide bed after the reformer (FIG. 1). When a high-temperature (200 to 300° C.) $CO_2$ separation membrane water-gas shift reactor is used as the CO removal system, the hydrogen concentration in the hydrogen-rich gas produced can be increased to more than 95% with CO elimination to 10 ppm or lower, which is the best fuel for fuel cells (see Table 2).

TABLE 2

Hydrogen-rich gas (% dry, He-free) obtained from CO removal system

| Hydrogen-rich gas produced | Autothermal Hydrodesulfurizing Reformer | CO Removal System |
|---|---|---|
| Sulfur level, wppm | 100 | 0 |
| $H_2$ | 55.44 | 96.76 |
| CO | 26.02 | <10 ppm |
| $CO_2$ | 15.81 | <350 ppm |
| $CH_4$ | 2.43 | 2.86 |
| $C_4H_9$ | 0.05 | 0.06 |
| $C_nH_m$, n > 4 | 0.25 | 0.29 |
| TOTAL | 100.00 | 100.00 |

Additional tests have been performed and the results show that sulfur levels in the carbonaceous fuels should be maintained in concentrations of less than about 1%, preferably less than about 1000 wppm, to improve the hydrogen yield.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:

1. A method for reforming a sulfur-containing carbonaceous fuel comprising, the steps of:

providing a sulfur-containing carbonaceous fuel;

adding sulfer to said sulfur-containing carbonaceous fuel, in an amount sufficient to maintain an equilibrium sulfer level on a surface of the catalyst composition, as hereafter defined;

maintaining the concentration of sulfur in said sulfur-containing carbonaceous fuel to less than 1% by weight;

then mixing said sulfur-containing carbonaceous fuel with steam and a gas selected from the group consisting of air and oxygen, to form a fuel/steam/oxidant mixture;

and autothermal reforming said fuel/steam/oxidant mixture by contacting said fuel/steam/oxidant mixture in an autothermal reformer with catalyst composition comprising a three-part catalyst with a dehydrogenation portion, an oxidation portion and a hydrodesulfurization portion, resulting in formation of a hydrogen-containing gas stream;

said hydrodesulfurization portion of said catalyst composition comprising a material selected from the group consisting of sulfates of rare earth metals, sulfides of rare earth metal, their substoichiometric metals, and mixtures thereof.

2. A method in accordance with claim 1, wherein said catalyst composition is suitable for reforming said sulfur-containing carbonaceous fuel at a temperature of less than about 900° C.

3. A method in accordance with claim 1, wherein said hydrogen-containing gas stream further comprises steam, $H_2S$, CO, $CO_2$, $CH_4$, unconverted fuel, and $N_2$ if air is used as an oxidant.

4. A method in accordance with claim 1, wherein said fuel/$H_2O$/oxidant mixture is preheated prior to said autothermal reforming.

5. A method in accordance with claim 1, wherein:

said autothermal reforming comprises autothermal hydrodesulfurizing reforming; and said autothermal reformer comprises an autothermal hydrodesulfurizing reformer.

6. A method in accordance with claim 3, wherein said CO is removed by a high-temperature membrane reactor.

7. A method in accordance with claim 1, wherein said carbonaceous fuel is selected from the group consisting of: gasoline, natural gas, alcohols, liquefied petroleum gas, diesel fuel, heating oil, naphtha, kerosene, jet fuel, alkanes, aromatics, alkenes and mixtures thereof.

8. A method in accordance with claim 1, wherein said contacting of said fuel/steam/oxidant mixture with said catalyst composition is carried out in said autothermal reformer at a pressure less than about 10 atmospheres.

9. A method in accordance with claim 1 including using said catalyst composition for a water-gas shift reaction.

10. A method in accordance with claim 1 wherein said sulfur-containing carbonaceous fuel is maintained so that the concentration of the sulfur in said sulfur-containing carbonaceous fuel is about 1000 wppm.

11. A method for processing sulfur-containing carbonaceous fuel, comprising the steps of:

providing a sulfur-containing carbonaceous fuel;

adding sulfur to said sulfur-containing carbonaceous fuel, in an amount sufficient to maintain an equilibrium sulfer level on a surface of the catalyst composition, as hereafter defined.

maintaining the concentration of said sulfur in said sulfur-containing carbonaceous fuel to less than 1% by weight;

then mixing said sulfur-containing carbonaceous fuel with steam and a gas selected from the group consisting of air and oxygen to form a fuel/steam/oxidant mixture;

autothermal reforming said fuel/steam/oxidant mixture in an autothermal reformer by contacting said fuel/steam/oxidant mixture with a three-part catalyst in an autothermal reformer to produce a hydrogen-rich gas containing a substantial amount of hydrogen;

said three part catalyst comprising a dehydrogenation portion, an oxidation portion and a hydrodesulfurization portion;

said hydrodesulfurization portion of said catalyst comprising a material selected from the group consisting of sulfates of rare earth metals, sulfides of rare earth metals, their substoichiometric metals, and mixtures thereof;

said autothermal reforming including substantially desulfurizing the sulfur-containing carbonaceous fuel to produce a hydrogen-rich gas; and passing said hydrogen-rich gas through a high-temperature membrane reactor which converts CO to additional $H_2$ and removes substantially all the $CO_2$ and $H_2S$ in the hydrogen-rich gas.

12. A method in accordance with claim 11 including feeding the hydrogen-rich gas into a fuel cell.

13. A method in accordance with claim 11 including combusting the hydrogen-rich gas in a power generating system.

14. A method in accordance with claim 11 including processing the hydrogen-rich gas in processing equipment.

15. A method in accordance with claim 11 including a preheating step selected from the group consisting of: preheating the sulfur-containing carbonaceous fuel, preheating the air, preheating the oxygen, preheating the water/steam, and preheating the fuel/steam/oxidant mixture.

16. A method in accordance with claim 11 including converting the sulfur impurities to $H_2S$, $CO_2$ and $H_2$.

17. A method in accordance with claim 11 including converting a substantial amount of CO to hydrogen and carbon dioxide by a water-gas shift reaction.

18. A method in accordance with claim 11 wherein:

said autothermnal reforming comprises autothermal hydrodesulfurizing reforming; and said autothermal reformer comprises an autothermal hydrodesulfurizing reformer.

19. A method in accordance with claim 11 including sulfating the three-part catalyst.

20. A method in accordance with claim 19 wherein the three-part catalyst is sulfated with said sulfur-containing carbonaceous fuel.

21. A method in accordance with claim 11 wherein the three-part catalyst comprises a sulfur tolerant catalyst.

22. A method in accordance with claim 11 wherein the three-part catalyst is resistant to coking.

23. A method in accordance with claim 11 wherein the a sulfur-containing carbonaceous fuel is selected from the group consisting of: gasoline, a methane-containing gas, diesel fuel, liquefied petroleum gas (LPG), heating oil, naphtha, alcohols, kerosene, jet fuel, alkanes, aromatics, alkenes, solutions derived from any of the preceding, one or more fractions from processing of petroleum, and one or more fractions from processing of chemicals.

24. A method in accordance with claim 18 including avoiding sulfur removal after autothermal hydrodesulfurizing reforming said sulfur-containing carbonaceous fuel in said autothermal hydrodesulfurizing reformer.

25. A method in accordance with claim 18 including removing sulfur compounds and $CO_2$ from said hydrogen-rich gas in said high temperature membrane reactor after autothermal hydrodesulfurizing reforming the fuel/steam/oxidant mixture in said autothermal hydrodesulfurizing reformer to produce a higher concentration of $H_2$ in the hydrogen-rich gas.

26. A method in accordance with claim 11 wherein said maintaining comprises maintaining the concentration of the sulfur in said sulfur-containing carbonaceous fuel to about 1000 wpm.

* * * * *

UNITED STATES PATENT AND TRADEMARK OFFICE
CERTIFICATE OF CORRECTION

PATENT NO. : 6,967,063 B2
DATED : November 22, 2005
INVENTOR(S) : Krumpelt et al.

It is certified that error appears in the above-identified patent and that said Letters Patent is hereby corrected as shown below:

Column 7,
Lines 37 and 39, correct "sulfer" to -- sulfur --.

Column 8,
Line 32, correct "sulfer" to -- sulfur --.

Signed and Sealed this

Twenty-fourth Day of January, 2006

JON W. DUDAS
*Director of the United States Patent and Trademark Office*